United States Patent [19]

Torii et al.

[11] Patent Number: 4,836,048
[45] Date of Patent: Jun. 6, 1989

[54] INDUSTRIAL ROBOT HAVING DUST-PROOF STRUCTURE

[75] Inventors: Nobutoshi Torii, Hachioji; Susumu Ito, Hino; Hiroshi Wakio, Hachioji; Kyoji Iwasaki, Tokyo, all of Japan

[73] Assignee: Fanuc Ltd., Yamanashi, Japan

[21] Appl. No.: 80,509

[22] PCT Filed: Nov. 6, 1986

[86] PCT No.: PCT/JP86/00562

§ 371 Date: Jul. 2, 1987

§ 102(e) Date: Jul. 2, 1987

[87] PCT Pub. No.: WO87/02927

PCT Pub. Date: May 21, 1987

[30] Foreign Application Priority Data

Nov. 6, 1985 [JP] Japan .................. 60-247270

[51] Int. Cl.⁴ .................. F16P 1/00; B25J 17/00
[52] U.S. Cl. .................. 74/608; 414/8; 301/28
[58] Field of Search .................. 74/608, 609, 612, 615, 74/613, 614, 491; 277/59, 3, 12; 414/8; 901/15, 28, 29, 49

[56] References Cited

U.S. PATENT DOCUMENTS

| | | | |
|---|---|---|---|
| 1,266,246 | 5/1918 | Fulton | 74/608 |
| 2,816,566 | 12/1957 | Warren | 74/608 X |
| 2,903,840 | 9/1959 | Teupel et al. | 74/608 X |
| 2,964,961 | 12/1960 | Gulick | 74/608 X |
| 2,964,969 | 12/1960 | Eckert | 74/608 X |
| 2,971,399 | 2/1961 | Roberts | 74/608 X |
| 4,114,529 | 9/1978 | Furmaga | 74/608 X |
| 4,124,078 | 11/1978 | Van der Lely et al. | 172/59 |
| 4,555,216 | 11/1985 | Buschor | 414/8 |
| 4,625,783 | 12/1986 | Notaras et al. | 74/608 |
| 4,637,978 | 10/1987 | Tada et al. | 901/28 |
| 4,688,983 | 8/1987 | Lindbom | 901/29 |

FOREIGN PATENT DOCUMENTS

| | | | |
|---|---|---|---|
| 59-24292 | 2/1984 | Japan | 74/608 |
| 61-197184 | 9/1986 | Japan . | |
| 62-63092 | 3/1987 | Japan . | |
| 62-203290 | 9/1987 | Japan . | |
| 0975328 | 11/1982 | U.S.S.R. | 74/608 |
| 1370013 | 10/1974 | United Kingdom | 74/612 |

Primary Examiner—Richard E. Moore
Assistant Examiner—Vinh Luong
Attorney, Agent, or Firm—Armstrong, Nikaido, Marmelstein & Kubovcik

[57] ABSTRACT

An industrial robot having a dust-proof structure is equipped with at least one dust cover having an opening at one end thereof and a linearly movable unit extending through the opening of the dust cover and movable back and forth in the longitudinal direction thereof. Suction is exerted by a suction unit inside the dust cover so that air is flows from outside the dust cover into the same through the opening. A ring member is disposed at the opening of the dust cover in such a manner as to encompass the outer periphery of the linearly moving unit through a gap. At least one annular groove for reserving air is disposed on the inner peripheral surface of the ring member so as to encompass the outer periphery of the linearly moving unit.

3 Claims, 4 Drawing Sheets

INDUSTRIAL ROBOT HAVING DUST-PROOF STRUCTURE

DESCRIPTION

1. Technical Field

The present invention relates to an industrial robot having a dust-proof structure, and more particularly, to a dust-proof structure of an industrial robot having a linearly movable unit extending through an opening formed in a dust cover.

2. Background of the Invention

Generally, an industrial robot such as a cylindrical coordinates robot, cartesian coordinates robot, SCARA (Selective Compliance Assembly Robot Arm) type robot or the like, has a vertically-linearly moving unit which moves linearly in a vertical direction, or a horizontally-linearly moving unit which moves linearly in a horizontal direction. Each of these linearly moving units extends to the exterior of a dust cover through an opening formed in the dust cover at the tip end thereof, and is moved back and forth in a longitudinal direction.

When an industrial robot of this type is used in a clean room, it is necessary to prevent the discharge of particles such as dust, lubricants, or the like, from the robot to the interior of the clean room, as much as possible. However, since the volume of the interior of the dust cover changes in accordance with a reciprocating motion of the linearly moving unit, particles such as dust, lubricants, or the like are easily discharged from the interior of the dust cover to the interior of the clean room through a gap between the opening of the dust cover and the linearly moving unit, due to a so-called breathing phenomenon which occurs in the interior of the dust cover.

A conventional dust cover having an opening formed therein is provided with a sealing ring in close contact with the outer peripheral surface of the linearly moving unit to seal the interior of the dust cover air tight. However, such a sealing structure has a disadvantage in that the clean room is contaminated with particles produced due to friction between the sealing ring and the linearly moving unit.

SUMMARY OF THE INVENTION

The present invention provides, as a means for solving the above-mentioned problem, an industrial robot having a dust-proof structure comprising: at least one dust cover having an opening; a linearly moving unit extending through the opening of the dust cover and moved back and forth in the longitudinal direction thereof; a suction in unit for exerting suction the interior of the dust cover so as to cause an air stream to flow from outside the dust cover into the dust cover through the opening; and a ring member disposed at the opening of the dust cover in such a manner that it encompasses the outer periphery of the linearly moving unit through a gap, the ring member being formed at the inner peripheral surface thereof with at least one annular groove, for reserving air, encompassing the outer periphery of the linearly moving unit.

In an industrial robot having the above-mentioned dust-proof structure, according to the present invention, the gap is maintained between the inner peripheral surface of the ring member and the linearly moving unit, and thus, the production of dust caused by abrasion is prevented. In turn, the interior of the dust cover is maintained at a negative pressure during operation of the suction unit, and thus, an air stream flowing from outside the dust cover into the interior of the dust cover is produced in the gap between the inner peripheral surface of the ring member and the linearly moving unit. The pressure inside the dust cover is apt to fluctuate due to the linear motion of the linearly moving unit. However, the annular groove disposed on the inner peripheral surface of the ring member can form an air reservoir therein and abruptly reduce the velocity of the flow of the air. As a result, a counterflow of air can be suppressed. Accordingly, it is possible to prevent a discharge of particles such as dust, lubricants, or the like from inside the dust cover to the outside, and therefore it is possible, according to the present invention, to provide an industrial robot having a dust-proof structure suitable for use in a clean room.

Preferably, the width of the annular groove in the axial direction thereof is several times greater than the depth thereof, and more preferably, the former is at least four times greater than the latter, in order to improve an air reserving function of the annular groove of the ring member.

Further, the ring member is also preferably formed at the inner peripheral surface thereof with a plurality of annular grooves which are spaced from one another in the axial direction thereof.

The foregoing and other features and advantages of the present invention will be more apparent from the detailed description made hereinafter with reference to the attached drawings.

BEST MODE FOR CARRYING OUT THE INVENTION

Figure 1:
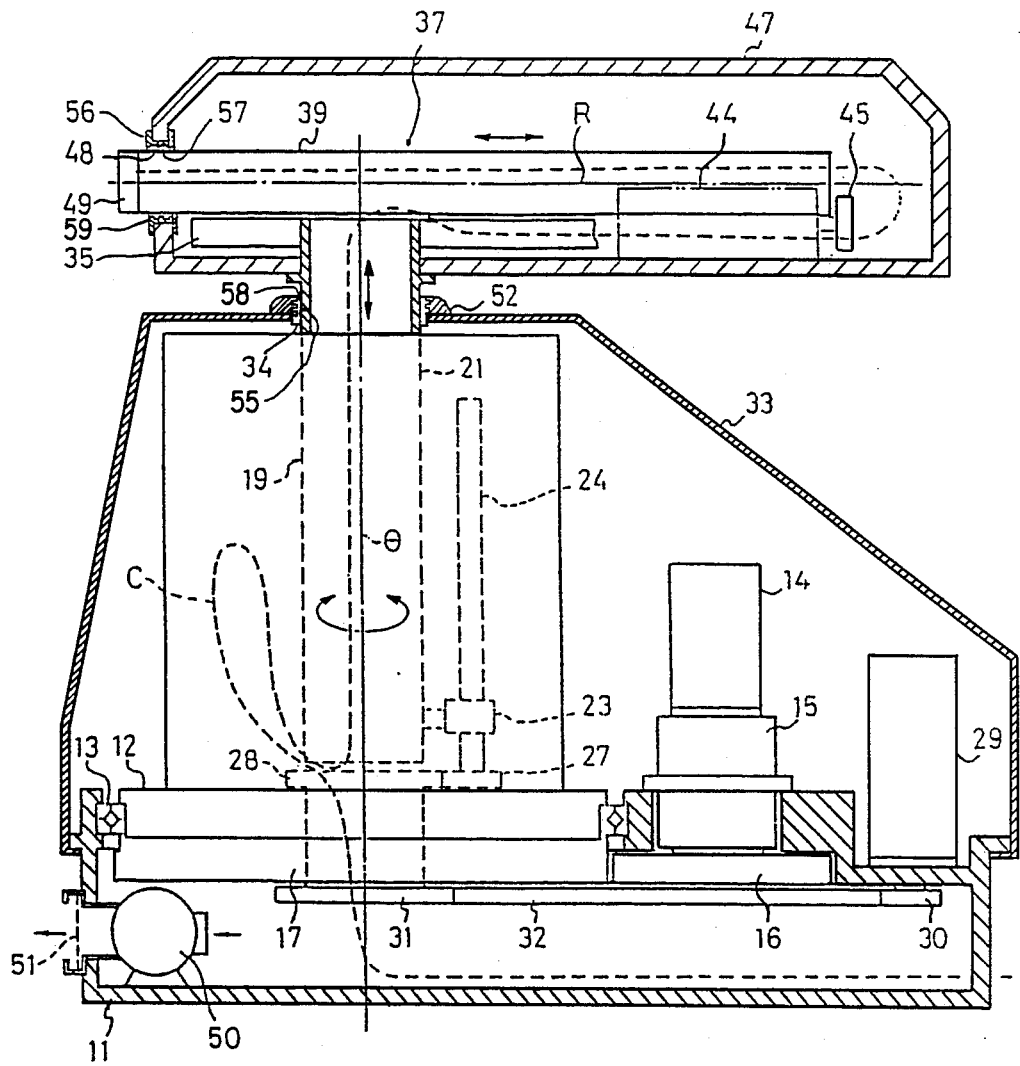
FIG. 1 is a vertical-sectional view of the industrial robot having a dust-proof structure, schematically illustrating an embodiment of the present invention.

FIGS. 1 to 4 show an embodiment of the present invention applied to a cylindrical coordinates robot. Referring to FIG. 1, the robot comprises a base 11 and a swingable body 12 which is rotatably supported through a cross-roller bearing 13 at the base 11 for rotation about an axis $\theta$. A motor 14 is attached to the base 11 for driving and rotating the swingable body 12. An output shaft of the motor 14 is connected to an input shaft of a reduction gear assembly 15. An output shaft of the reduction gear assembly 15 is provided with a gear 16 fixed thereto and meshing with a gear 17 fixed to the swingable body 12.

Figure 2:
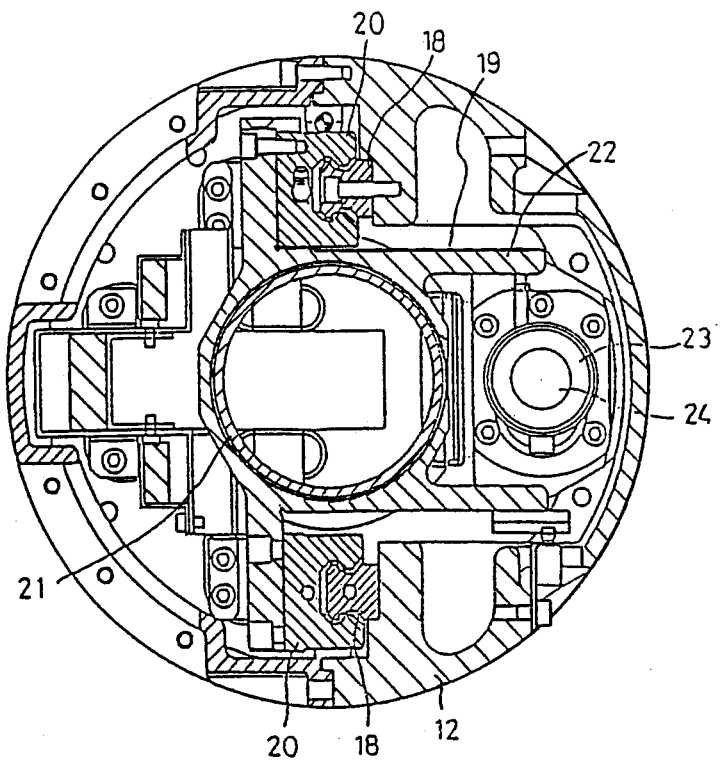
FIG. 2 is a horizontal-sectional view illustrating the vertically-linearly moving unit of the robot shown in FIG. 1.

As shown in FIG. 2, a pair of guide rails 18 extending in parallel to the axis $\theta$ are fixed to the swingable body 12, and a pair of sliders 20 fixed to a vertically-linearly moving unit 19 are slidably fitted to the guide rails 18, respectively.

The vertically-linearly moving unit 19 is provided with a vertical-cylindrical pipe 21 extending along the axis $\theta$ and a bracket 22 fixed to the cylindrical pipe 21.

The bracket 22 is provided with a ball-nut 23 fixed thereto and joined with a ball-screw shaft 24 extending parallel to the axis θ. The ball-screw shaft 24 is rotatably supported on the swingable body 12 through a bearing (not shown). The ball-screw shaft 24 is provided at the lower end thereof with a gear 27 fixed thereto, and the swingable body 12 is provided at the lower end thereof with a gear 28 rotatably attached thereto for rotation about the axis θ and meshing with the gear 27. The base 11 is provided with a motor 29 for driving and rotating the ball-screw shaft 24. A pulley 30 is fixed to an output shaft of the motor 29, and the pulley 30 is connected through a belt 32 to a pulley 31 fixed to the gear 28 which drives the gear 27 as shown in FIG. 1.

When the motor 29 is actuated, the ball-screw shaft 24 is rotated, and thus the vertically-linearly moving unit 19 is moved linearly along the axis θ together with the ball-nut 23.

The swingable body 12 and the motors 14 and 29 are covered with a dust cover 33 fixed to the base 11. The dust cover 33 has at the upper end thereof an opening 34, and the cylindrical pipe 21 of the vertically-linearly moving unit 19 extends upward through the opening 34 of the dust cover 33.

Figure 3:
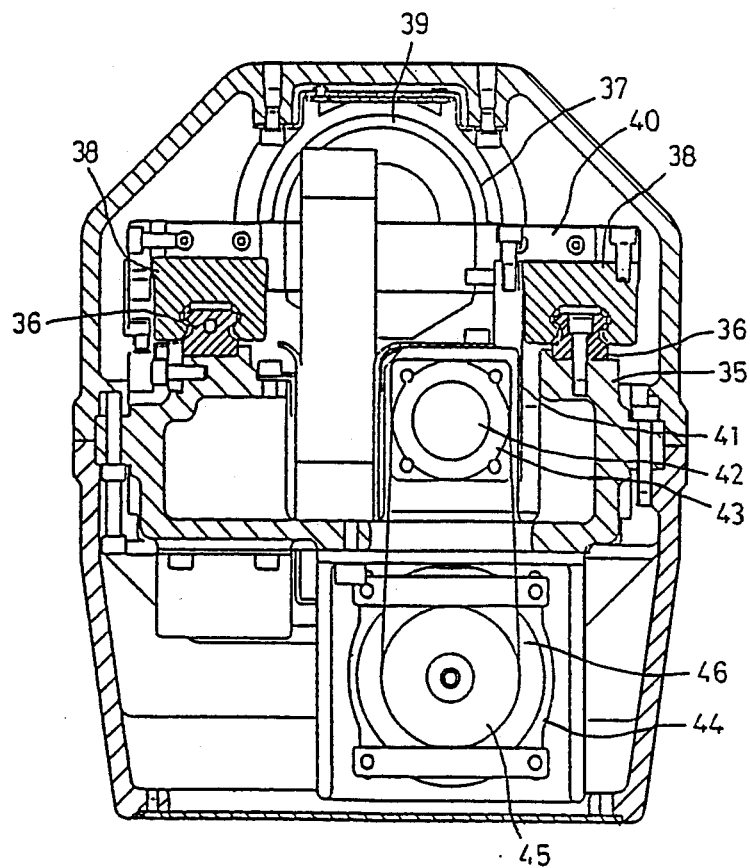
FIG. 3 is a vertical-sectional view illustrating the horizontally-linearly moving unit of the robot shown in FIG. 1; and, FIG. 4 is a vertical-sectional view illustrating the ring member disposed between the vertically-linearly moving unit and the horizontally-linearly moving unit.
Figure 4:
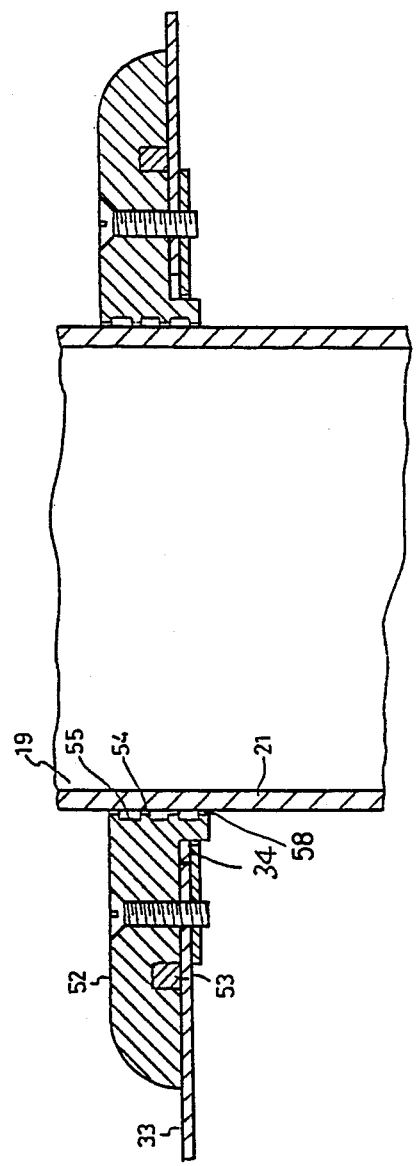

As shown in FIG. 1, the vertical-cylindrical pipe 21 is provided at the upper end thereof with a horizontal arm base 35. As shown in FIG. 3, the horizontal arm base 35 is provided with a pair of guide rails 36 fixed thereto and extending parallel to an axis R which is perpendicular to the axis θ. A pair of sliders 38 fixed to a horizontally-linearly moving unit or arm 37 are slidably engaged with the guide rails 36.

The horizontally-linearly moving arm 37 comprises a cylindrical pipe 39 extending along the axis R and a bracket 40 fixed to the pipe 39. The bracket 40 is provided with a ball-nut 41 fixed thereto. A ball-screw shaft 42 extending in parallel to the axis R is joined with the ball-nut 41 and rotatably supported at the horizontal arm base 35 through a bearing (not shown). A pulley 43 is fixed to the ball-screw shaft 42. A motor 44 for driving and rotating the ball-screw shaft 42 is attached to the horizontal arm base 35, and a pulley 45 is fixed to an output shaft of the motor 44 and connected to the pulley 43 through a belt 46.

When the motor 44 is actuated, the ball-screw shaft 42 rotates, and thus the horizontally-linearly moving arm 37 moves linearly along the axis R together with the ball-nut 41.

A dust cover 47 is attached to the horizontal arm base 35. The dust cover has at a forward end thereof an opening 48, and the pipe 39 of the horizontally-linearly moving arm 37 extends outward through the opening 48. The pipe 39 is provided at the tip end thereof with a wrist portion 49 for attaching thereto a working attachment such as a robot hand (not shown). Signal cables and power cables provided to the wrist portion 49 are arranged in the robot as schematically shown by a broken line C in FIG. 1.

The interior of the dust cover 47 is in communication with the interior of the dust cover 33 through the interior of the vertical-cylindrical pipe 21. The interior of the dust cover 33 is connected to a suction side of a suction blower 50 mounted on the base 11, and an air-discharging side 51 of the suction blower 50 is open to the exterior of the base 11.

When the blower 50 is actuated, the interiors of the base 11 and the dust covers 33 and 47 are subjected to suction therefrom, and thus the interiors thereof are maintained at a negative pressure.

In the embodiment shown in the drawings, the blower 50 is incorporated into the robot. However, the blower 50 may be separate from the robot and arranged outside the clean room in such a manner that the suction side of the blower is connected to the interior of the robot through a pipe arrangement.

The dust cover 33 is provided at the opening 34 thereof with a ring member 52. As specifically shown in FIG. 4, the ring member 52 and the dust cover 33 are sealed by a seal ring 53 disposed therebetween. A small gap 58 is formed between the inner peripheral surface 54 of the ring member 52 and the outer peripheral surface of the vertical-cylindrical pipe 21 of the vertically-linearly moving unit 19. The ring member 52 is formed at the inner peripheral surface 54 thereof with a plurality of annular grooves 55 for reserving air. The annular grooves 55 are spaced from one another in an axial direction so as to encompass the outer periphery of the vertical-cylindrical pipe 21.

In the embodiment shown in the drawings, the ring member 52 has a split structure and thus can be attached to the dust cover 33 after the vertical-cylindrical pipe 21 and the dust cover 33 are assembled with each other. Accordingly, the ring member 52 can be assembled easily.

The dust cover 47 is provided at the opening 48 thereof with a ring member 56 having annular grooves 57. The annular grooves 57 of the ring member 56 have substantially the same construction as that of the annular grooves 55 of the ring member 52.

In the industrial robot having the above-mentioned dust-proof structure, the gap 58 is maintained between the inner peripheral surface 54 of the ring member 52 and the outer peripheral surface of the cylindrical pipe 21 of the vertically-linearly moving unit 19, so it is possible to prevent a production of dust caused by sliding friction or abrasion. Similarly, a gap 59 is maintained between the ring member 56 and the cylindrical pipe 39 of the horizontally-linearly moving unit 37, so it is possible to prevent a production of dust caused by a sliding friction or abrasion.

The pressures in the dust covers 33 and 47 are maintained at a negative pressure during operation of the blower 50, so air streams flowing from outside of the dust covers 33 and 47 into the interiors of the dust covers 33 and 47 through the gaps between the inner peripheral surfaces of the ring members 52 and 56 and the cylindrical pipes 21 and 39, are produced, respectively.

The pressures inside the dust covers 33 and 47 are apt to fluctuate due to the linear movement of the cylindrical pipes 21 and 39, respectively. However, the velocity of the flow of air is abruptly reduced at each of the annular grooves 55 and 57 formed on the inner peripheral surfaces of the ring members 52 and 56, and an air reservoir is formed in each of the grooves. Accordingly, it is possible to restrain a counterflow of air, and thus a discharge of particles such as dust, lubricants, or the like from the interiors of the dust covers 33 and 47 to the exteriors thereof can be prevented.

In order to improve an air-reserving function of each of the annular grooves 55 and 57, preferably the width of each of the annular grooves 55 and 57 in the axial direction is several times greater than the depth thereof, and more preferably, the width of each of the annular grooves 55 and 57 in the axial direction is at least four times greater than the depth thereof.

While particular embodiments of the present invention have been described in the disclosure and drawings attached thereto, it will be understood as a matter of course that the present invention is not limited thereto, since modifications can be made within the scope of the invention as stated in the attached claims.

For example, the pipe 39 of the horizontally-linearly moving arm 37 may have an outer peripheral contour having a rectangular cross-section. In this case, the inner peripheral surface of the ring member 56 is also formed with a rectangular shape, to ensure a constant gap between the ring member 56 and the outer peripheral surface of the rectangular pipe 39.

The present invention also can be applied to a cartesian coordinates robot, polar coordinates robot, SCARA-type robot, or the like having a linearly moving unit or linearly moving arm, other than the above-mentioned cylindrical coordinates robot.

We claim:

1. An industrial robot having a dust-proof structure comprising:

at least one dust cover having an opening;

a linearly moving unit extending through said opening of said dust cover and moved back and forth in the longitudinal direction thereof;

a suction unit for exerting suction on an interior of said dust cover to cause an air stream to flow from outside said dust cover into said dust cover through said opening; and a ring member disposed at said opening of said dust cover in such a manner as to encompass the outer periphery of said linearly moving unit through a gap, said ring member being formed at the inner peripheral surface thereof with at least one annular groove for reserving air, encompassing said outer periphery of said linearly moving unit.

2. An industrial robot according to claim 1, characterized in that the width of said annular groove in the axial direction thereof is at least several times greater than the depth thereof.

3. An industrial robot according to claim 1, characterized in that said ring member is formed at said inner peripheral surface thereof with a plurality of said annular grooves spaced from each other in an axial direction.

* * * * *